United States Patent [19]

Lenz

[11] Patent Number: 5,064,013

[45] Date of Patent: Nov. 12, 1991

[54] HYDRAULICALLY DRIVEN ELECTRICALLY POWERED VEHICLE WITH ENERGY RECAPTURE

[76] Inventor: Erwin Lenz, 180 Cabrini Blvd., New York, N.Y. 10033

[21] Appl. No.: 620,362

[22] Filed: Nov. 29, 1990

Related U.S. Application Data

[63] Continuation-in-part of Ser. No. 533,485, Jun. 5, 1990, abandoned, and a continuation-in-part of Ser. No. 240,036, Sep. 2, 1988, Pat. No. 4,947,646.

[51] Int. Cl.$^5$ .............................................. B60K 1/04
[52] U.S. Cl. .................................... 180/65.3; 60/484; 180/242; 180/65.5; 180/308
[58] Field of Search ................... 60/413, 484, 485; 180/165, 308, 65.3, 242, 65.5, 305, 246, 65.1

[56] References Cited

U.S. PATENT DOCUMENTS

| | | | |
|---|---|---|---|
| 2,918,982 | 12/1959 | Vlachos | 180/65.3 X |
| 3,828,880 | 8/1974 | Smith | 180/65.3 X |
| 4,020,917 | 5/1977 | Lutterschmidt | 180/308 |
| 4,348,863 | 9/1982 | Taylor et al. | 60/413 X |
| 4,663,937 | 5/1987 | Cullin | 180/65.3 X |
| 4,883,141 | 11/1989 | Walker | 180/308 X |
| 4,947,646 | 8/1990 | Lenz | 418/259 X |

*Primary Examiner*—Andres Kashnikow
*Assistant Examiner*—Michael Mar
*Attorney, Agent, or Firm*—Barry G. Magidoff

[57] ABSTRACT

The present invention provides an electrically powered, hydraulic drive system for a vehicle, with the capability of being recharged with electrical energy from vehicle momentum, utilizing the hydraulic drive system. The power for the electric motor, which drives the vehicle wheels through a hydraulic rotator, is obtained from an energy storage device, which can be recharged by recapturing vehicle kinetic energy during braking of the vehicle, through an electric generator which is linkable to the hydraulic rotator. The hydraulic system includes a central hydraulic rotator driven by the electric motor or driving the generator, and satellite rotators driving the wheels, including dirigible front wheels.

12 Claims, 12 Drawing Sheets

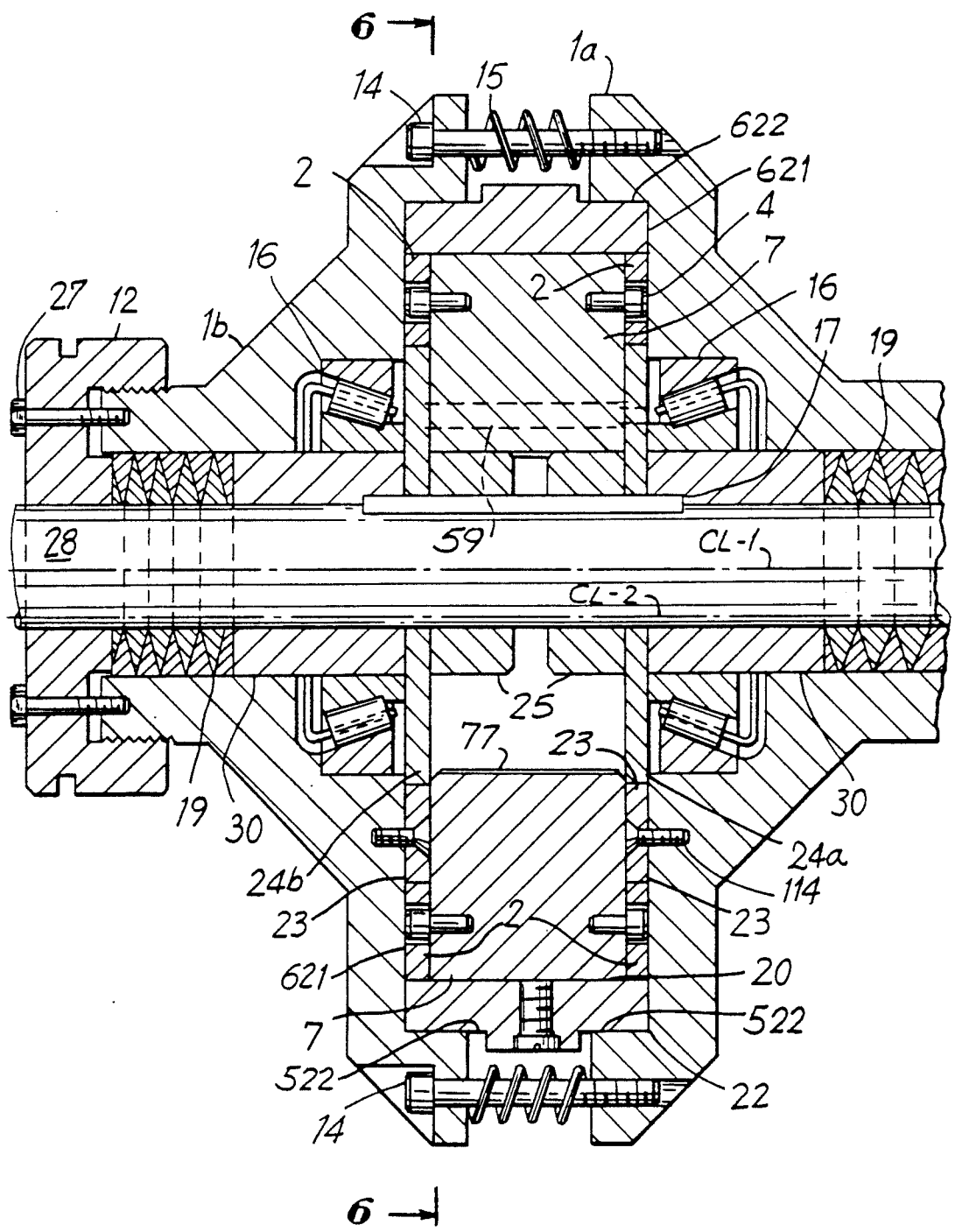

HYDRAULICALLY DRIVEN ELECTRICALLY POWERED VEHICLE WITH ENERGY RECAPTURE

This application is a continuation-in-part of copending applications Ser. No. 07/533,485, filed June 5, 1990 now abandoned, and Ser. No. 240,036, filed Sept.2, 1988, now U.S. Pat. No. 4,947,646.

BACKGROUND OF THE INVENTION

This invention is directed to a hydraulic-electric motor vehicle driven by a plurality of hydraulic fluid wheel drive units and a central hydraulic driver motor powered by an electric motor. More particularly, this invention is directed to such a vehicle providing for energy retrieval and storage enhancement. The invention is further directed to a vehicle having steerable drive wheels, wherein the central turbo rotator drive motor is hydraulically pressure linked to the steerable wheel hydraulic drive motors through high pressure rigid tubing having rotatable pressure-tight joints.

Suitable hydraulic rotator motors which are especially useful in the present invention are described in my previously issued U.S. Pat. No. 4,947,646, and especially suitable rigid tube joint linkages are further disclosed in my co-pending application Ser. No. 07/513,603, filed Apr. 24, 1990.

Although hydraulic drive mechanisms for vehicles have been previously suggested, including the use of electricity as the power source, as part of an increased interest in reducing the pollution created by the internal combustion engine, the problem often met with in such electrically driven systems is the short driving range before a recharging stop is required.

SUMMARY OF THE INVENTION

In accordance with the present invention, there is provided an electrically powered, hydraulic drive system for a vehicle, having means for recovering electrical energy from vehicle momentum, utilizing the hydraulic drive system. The power for the electric motor is obtained from an energy storage device, which can be recharged by recapturing vehicle kinetic energy, through an electric generator which is linkable to the central hydraulic rotator during braking of the vehicle.

There is further provided by this invention a hydraulic drive system for a dirigibly steered wheeled vehicle, wherein the hydraulic fluid is carried in rigid tubing and wherein the rigid tubing is designed and adapted to pivot with a pair of dirigibly steerable wheels directly driven by slave hydraulic rotators. Preferably, all of the wheels of an, e.g., four-wheeled motor vehicle, are connected to and driven by a separate slave hydraulic rotator.

It is thus an object of the present invention to provide an electric powered, hydraulically driven vehicle having an extended range. It is a further object of the present invention to provide an electrically powered hydraulically driven vehicle wherein means are provided for regeneratively recharging the electric power source. Yet another object of the present invention is to utilize the momentum of the vehicle, while slowing, to recharge the battery or other electric energy storage system.

Yet another object of the present invention is to provide a hydraulically powered vehicle wherein dirigibly steerable wheels are directly driven by a hydraulic slave rotor mechanically connected by rigid hydraulic tubing to a central rotator, wherein the rigid tubing can rotate as the steerable wheels rotate about a vertical axis.

The hydraulic drive system of the present invention comprises a central hydraulic turbo-rotator drive unit, operably connected to, and powered by, an electric motor, through power transmission coupling such as a disengageable clutch. A wheel, and preferably all of the wheels, of the vehicle are in operable mechanical connection with a slave, or driven, hydraulic rotator unit. Each slave hydraulic rotator unit is in fluid flow pressure connection with the central turbo-rotator, preferably through a series of rigid tubing; the rigid tubing preferably comprises pressure resistant rotatable joints, such as is disclosed in my prior copending application Ser. No. 07/513,603, filed Apr. 24, 1990. The use of such rotatable joints is especially useful when all four wheels are powered, including the steerable wheels.

The central turbo-rotator is also connectable through a second transmission coupling, e.g., a clutch, to an electric generator capable of recharging a battery. A single electrical control switch can be used to apply power to the electric motor and to engage the first coupling when the vehicle is to be accelerated; and the same switch can be used to disconnect the electrical power source from the motor, to disengage the first coupling and to engage the second coupling, connecting the turbo-rotator to the generator, which charges the electric power reservoir, or battery, when it is desired to decelerate a moving vehicle. There is also preferably provided a separate conventional braking system.

The central turbo-rotator and each hydraulic rotator is reversible in direction for accelerating the vehicle in either forward or reverse, ultimately determined by the direction of the electric motor. Each hydraulic unit is similarly capable of acting as a pressure pump, or driving unit, or as a driven unit: That is, during slowing of the vehicle, the wheel hydraulic units are powered by the vehicle momentum, and provide pressure to drive the central turbo-rotator, which in turn drives the generator to recharge the e.g., battery. The fluid pressure connection between the wheel rotators and the central turbo rotator are preferably direct, so that fluid flow through the piping is reversible and no separate valve system for parallel reverse flow is required.

There is further preferably provided a system of flow divider means which substantially equally divides the flow between the front and rear wheels and between the wheels on the left and right sides of the vehicle, when the wheels are being driven from the central turbo-rotator (See for example U.S. Pat. No. 3,910,369 to Chichester et al).

The combined electro hydraulic system of this invention provides means for extending the operating range of a battery-powered electric motor between required recharging, while further improving the transmission system to avoid the problem of direct mechanical linkages between an electric motor and the driven wheels, specifically eliminating intermediate gearing means, i.e., of the stepdown variety, and avoiding high frequency vibrations often associated with electric motors directly linked to the driven mechanical mechanism.

BRIEF DESCRIPTION OF THE DRAWINGS

The drawings attached hereto are provided to depict a preferred embodiment of the present invention. This embodiment exemplifies, and is not to be considered exclusive of, the scope of the present invention. In certain portions, the drawings may be schematic so as to reflect the conventional nature of that portion of the system. Referring to the drawings:

FIG. 5 is a longitudinal cross-sectional view of the turbo rotator unit of FIG. 3;

FIG. 5b is a cross-section along lines A—A of FIG. 5a;

Figure 1:
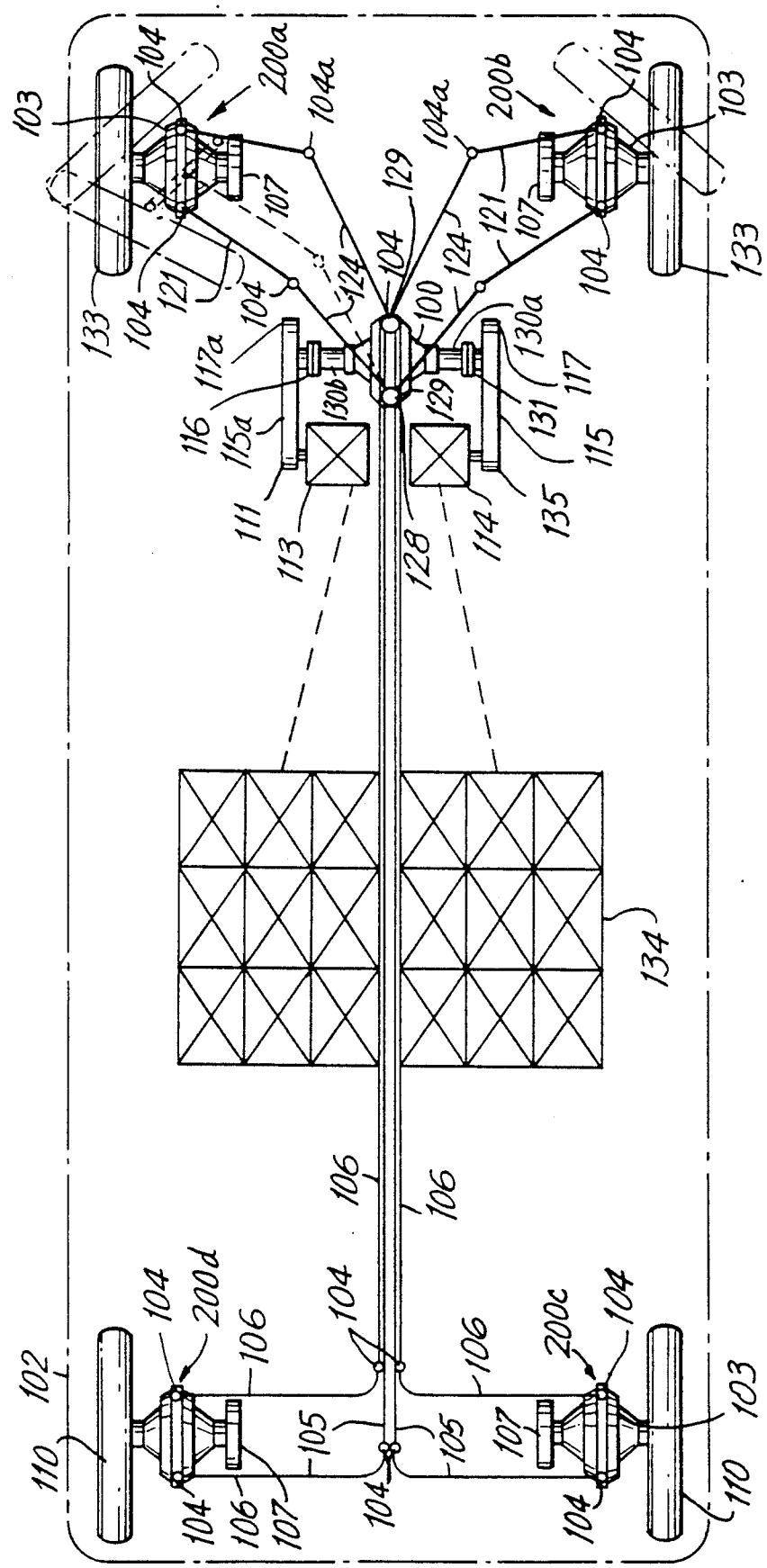
FIG. 1 is a schematic illustration of a four-wheel drive vehicle driven by an electro-hydraulic drive system in accordance with the present invention.

Referring to the drawings, the present invention is depicted in a preferred four wheel drive vehicle, powered by a combination electro-hydraulic motor, comprising a central turbo-rotator driver (generally indicated by the numeral 100), in fluid flow connection with four hydraulic rotator wheel motors, or followers (each generally indicated by the numeral 200). The turbo-rotator drive unit 100 is powered by an electric motor 114. The turbo-rotator 100 and the four wheel rotator units 200 are of similar but not identical design; the four wheel rotator units 200 are substantially identical. The four wheel rotator units 200 are of smaller volumetric capacity than the turbo-rotator unit 100. A general description of the operation and general construction of any of these hydraulic units is set out in my earlier U.S. Pat. No. 4,947,646, which generally explains the construction and operation of all of these units, but especially with regard to the wheel rotator unit, is incorporated by reference.

The turbo-rotator 100 has opposed dual mechanical power outputs, i.e., a pair of shafts 28, connected axially to opposite sides of the turbo-rotator. On one side, the shaft 28a is supported by a bearing 130a and is connected through a suitable clutch 131, a pair of pulleys 135,117 and a drive belt 115, to an electric motor 114. The opposite shaft 28b of the turbo rotator supported by a bearing 130b and is connected through a suitable clutch 116, a pair of pulleys 111,117a and drive belt 115a to an electric generator 113. The electric motor 114 obtains power from an electrical energy reservoir, such as a battery 134, to drive the turbo-rotator 100; generator 113 in turn is driven by the turbo-rotator 100 and is so connected electrically as to recharge the electrical energy reservoir, or battery 134. The two clutches 116,131 are in turn engaged and disengaged by electrically operated means, preferably interconnected with the electric motor 114 and the generator 113, such that completing the circuit between the electric motor 114 and the e.g., electric battery 134, actuates the first clutch 131 into the engaged position, thereby mechanically connecting the electric motor to drive the turbo rotator. Disconnecting the electrical connection between the electric motor and the electric battery and connecting the generator to the battery, disengages the first clutch 131 and mechanically engages the second clutch 116, thereby mechanically connecting the turbo rotator 100 to the generator 113, permitting recharging of the battery 134.

Figure 2:
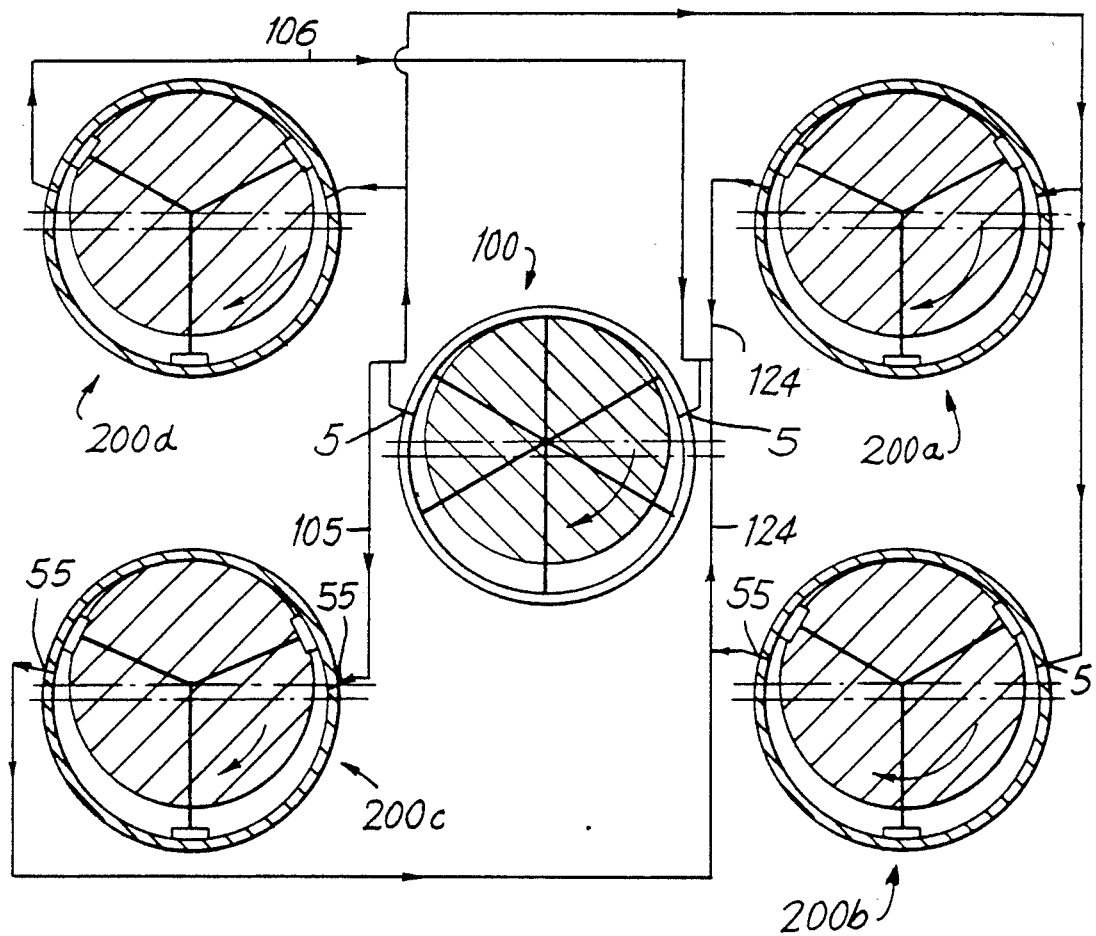
FIG. 2 is a conceptual representation of the hydraulic system utilized in the vehicle of FIG. 1.
Figure 3:
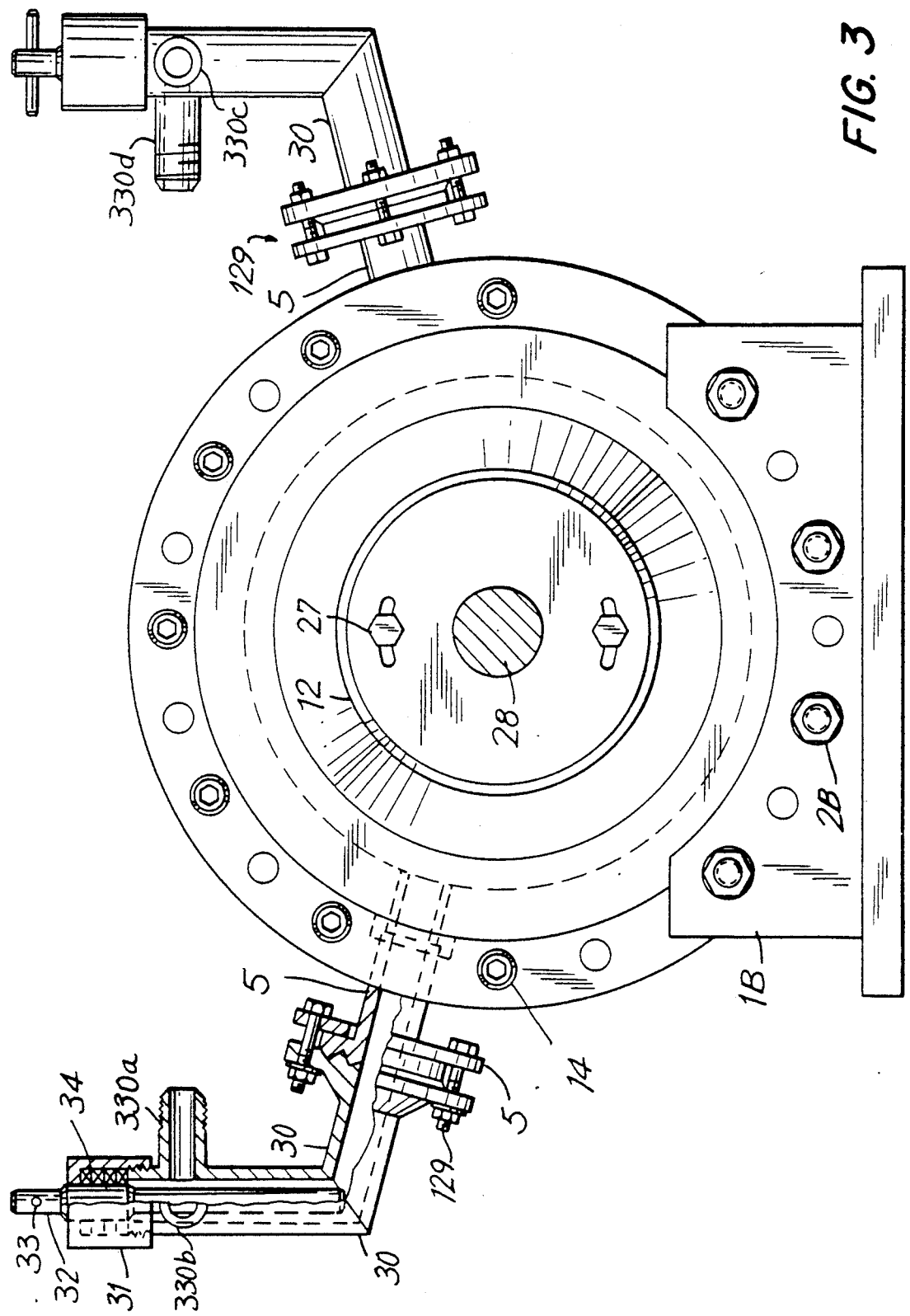
FIG. 3 is a side elevation view of the hydraulic central turbo rotator used in the embodiment of FIG. 1.

Two fluid pressure-connecting ports 5 on the turbo-rotator 100 connect to the ports 55 on each of the four wheel rotators 200; each port 5,55 is capable of functioning as either an inlet or an outlet for each hydraulic unit 100,200. The four wheel hydraulic units 200a,b,c,d, are connected in parallel to the central turbo-rotator unit, i.e., each port 5 of the turbo-rotator 100 is in fluid pressure flow connection to one corresponding port 55 on each of the wheel hydraulic rotators 200, via manifolds 30 and branch stubs 330a,b,c to rigid pressure tubes 124,121 to the front wheels 132 and tubes 105,106 to the rear wheels 110. As is shown by the schematic of FIG. 2, rotation of the turbo-rotator 100 in one direction, causes flow through pressure tubes 105,124, in the direction of the arrows, causing rotation of all of the wheel rotators 200, in the same direction.

The first two branch lines 330a,b each connect, to a tube 124, which in turn connects through a second tube 121 to the two front wheel rotators 200, and the third branch line 330c connects to a rear manifold 331, which in turn is connected to the two rear wheel rotators 200c,d, through rearwardly extending tubing 105,106; and a second fluid pressure connecting means independently connects, in parallel, the second port 5 on the turbo rotator 100 to the second port 55 on each of the four wheel rotators 200, in the same manner. Preferably, the first and second pressure connecting means 124,105,106 and 121 are formed of rigid tubing or piping, and have suitable rotatable, but pressure-resistant, joints 104, so as to permit at least one pair of wheels 133, generally the front pair, to be dirigibly mounted and thus pivotable about a vertical axis, to steer the vehicle, as in an Ackerman-type steering system. The joints 104 permit the rigid tubes 124,121 to pivot with the front wheels 133. Rotation of the dirigibly movable steering wheels can be accomplished by conventional steering means which do not form a part of this invention.

The fluid pressure connecting means between the wheel hydraulic rotators 200 and the turbo rotator 100 permit flow in two directions, and thus allow driving the vehicle in the reverse direction, by merely reversing the direction of rotation of the electric motor 114, or by putting in a suitable transmission between the clutch 131, and the turbo-rotator 100.

There can also be provided conventional brakes 107, of either the disc or drum type, attached to each of the wheels, for emergency stops; the braking system is omitted for reasons of simplicity, but is controlled and activated in a conventional manner, preferably by the same pedal which engages and disengages the clutches 116,131.

Figure 6:
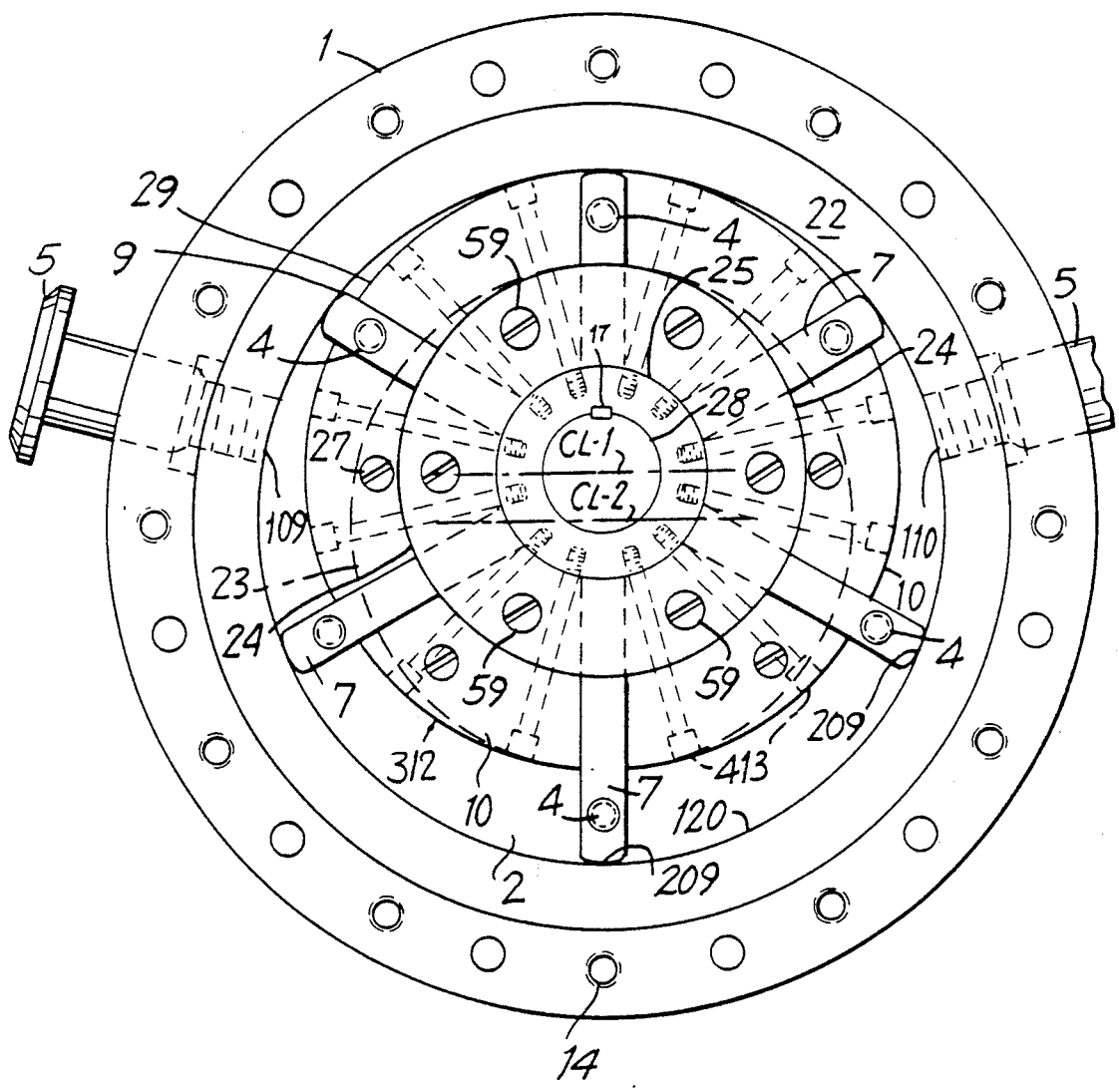
FIG. 6 is a rear view, with the cover and one ring guide removed taken along lines 6—6 of FIG. 5.
Figure 6A:
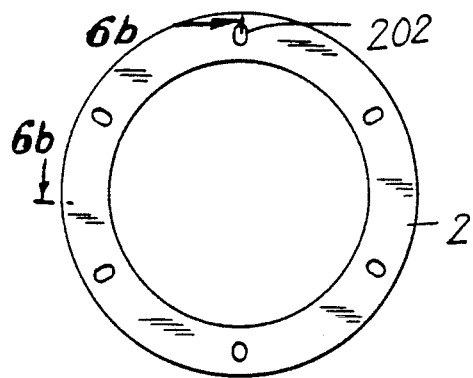
FIGS. 6a and 6b are front and side elevation views of the ring guide of FIG. 6.
Figure 6B:
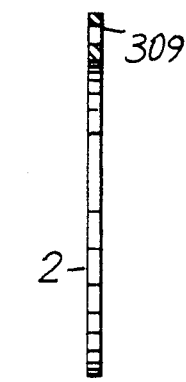
Figure 6C:
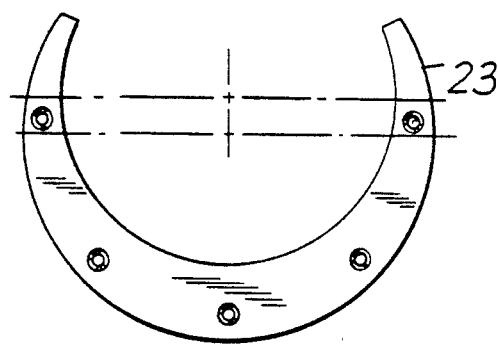
FIGS. 6c and 6d are front elevation and side elevation views, respectively, of the crescent spacer of FIG. 6.
Figure 6D:
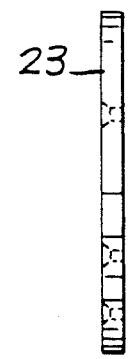
Figure 6E:
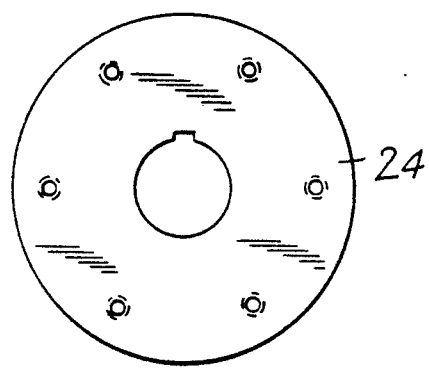
FIG. 6e and 6f are plan and side elevation detail views, respectively, of the ring flange of FIG. 6.
Figure 6F:
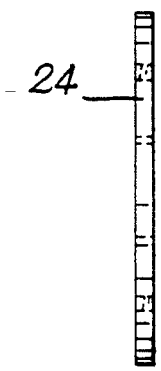
Figure 7:
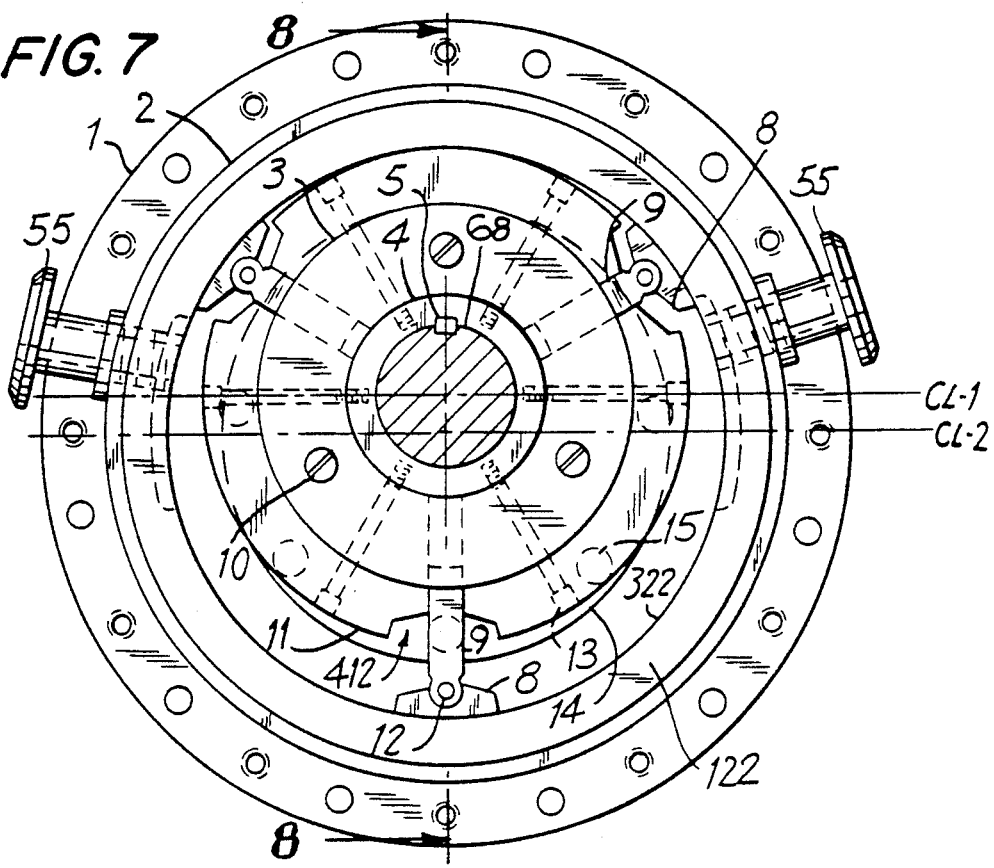
FIG. 7 is a side elevation view with the one side housing and ring guide removed, of one of the wheel rotators used in the present invention.

The differences in construction between the turbo-rotator 100 and the four wheel rotator units 200 provide for a subtle but important difference in their operations; the turbo-rotator driver unit 100 is designed to operate at a relatively higher speed, similar to a centrifugal pumping system, whereas the four wheel rotator units 200 operate at a slower speed, similar to rotating positive displacement type pumps. As explained above, the general construction of these units is substantially the same as is set forth in my earlier U.S. Pat. No. 4,947,646, (the wheel rotators being substantially identical in construction). The common designs of the rotators can be described together, referring to FIGS. 5–6$f$ and FIGS. 7,8, respectively, for ease of reference, as follows: the rotators comprise a housing formed from a fixed cylindrical casing 22,122 and a pair of substantially symmetrical side housing sections 1,301; the housing sections define a central interior space symmetrical about both major axes. Within each housing there is journaled, eccentrically, a complex rotor, generally indicated by the numeral 312,412, formed from a plurality of core sections 10, 11 (six core sections 10 in the turbo-rotor core 312 and three core sections 11 in the wheel rotor cores 412) and an equal number of blades 7,9 slidably held between the core sections and rotatable together with the core sections. Defined between each rotor 312,412 and the casing 22,122 is an arcuate working chamber, through which extends the blades 7,9, and into which opens the two port openings 5,55, serving as an inlet and an outlet, through each central cylindrical casing 22,122.

Each rotor 312,412 is rotatably journaled within the casing about an axis CL-1, radially displaced from the central axis CL-2 of the casing 22; the blades 7,9 are movable radially relative to the rotor core segments 10,11. The outer ends of the blades 7,9 are continuously in contact with the inner circumferential surface of the central casing 22,122, as the core rotates and as the blades reciprocate relative to the core segments 10,11.

The rotor blades 7,9 are slidably mounted in the rotors 312,412 for movement radially with respect to the core sections 10,11. The radially inwardmost ends 77 of each blade 7,9 has a slight concave radius; the wheel rotor blades 9 are secured at their outer circumferential ends to curved blade shoes 8. The outer curved surfaces of the blade shoes 8 are designed to sealingly wipe against the inner cylindrical surface 322 of the cylindrical casing 122. The shoes 8 of wheel rotor blades 9 thus more effectively sealably divide the working chamber into separate sealed arcuate sections, thus providing what is, in effect, a positive displacement pump.

The turbo-rotator 100 acts, in effect, more similarly to a centrifugal pumping system, because the rounded outer ends of the six blades 7, merely tangentially sweep along the inner cylindrical surface 120 of the cylindrical central housing 22. This permits relatively higher rotational speeds for the turbo-rotator 100, without the higher degree of pressure division provided in the wheel rotator 200.

The cylindrical casings 22,122, in both rotators 100,200 are intended to be fixed against rotation, while the complex rotors 312,412 rotate eccentrically therewithin.

Pairs of opposed drive shafts 28,6 are rigidly and concentrically secured to, and rotate with the rotors 312,412. The shafts 28,6 extend axially outwardly from both sides of the rotors 312,412, to transmit mechanical energy from or to the hydraulic turbo-rotator and rotator units 100,200. The rotors 312,412 are supported within the casings 22,122 by the shafts 28,6.

Referring to the details of construction of the fluid drive turbo-rotator unit of the present invention, the casing is formed of three parts, a central casing section 22 and front and rear housing sections 1$a$ and 1$b$. The front and rear housing sections 1$a$ and 1$b$ are adjustably secured on and around the two shoulders 522 on the outer cylindrical edge of the central casing section 22 by spring-loaded casing bolts 14 distributed around the outer circumference of the two side casing sections 1, and biased by helical springs 15; this permits adjustment of the running fit between the rotating complex rotor 312 and the internal transverse surface 621 of each front and rear casing section 1$a$, 1$b$. The two shoulders 522 and the inner circumferential surfaces 622 of the side casing sections 1$a,b$ must be concentric with the inner cylindrical surface 20, and machined to be in continuing contact with the, also machined, mating surfaces 621 of the side casing sections 1$a$, 1$b$.

Although, as shown, the rotor 312 is formed of several parts, the rotor sections 10 are rigidly interconnected, so that the rotor must rotate as a single integral unit, relative radial movement being permitted of the blades 7.

The turbo-rotator 100 is constructed by first fitting an end cap 12 onto the end of a side housing section 1$b$, and then inserting the labyrinth seal rings 19 within the housing section bore, butting up against the cap 12. A housing sleeve 30, having an internally keyed channel extending partially along the central internal circumference, is fitted into the side casing section 1$b$, so that the sleeve 30 butts up against the final ring of the labyrinth seal 19; the tapered roller bearing 16 is inserted in place. The drive shaft 28 is then fitted through the housing sleeve 30, such that the shaft key ridge 17 mates into the slot in the sleeve 30, up to the end of the slot, so that the shaft 28 rotates with the sleeve 30, within the bearing roller 16.

A crescent-shaped spacer 23 (FIGS. 6$c,d$) is rigidly secured by flat head, countersunk machine screws to the inside surface 621 of the side housings 1$a$,1$b$. A constructed complex rotor 312 is slip fitted onto the shaft 28, mating with the key ridge 17.

The complex rotor 312 is formed by securing the six identical core segments 10 circumferentially around a pair of centrally separated core rings 25, by twenty-four (24) radially extending bolts 29 countersunk into the core segments 10. The six blades 7 are slidably held between the core segments 10. The key slots formed in the internal channel of each of the core rings 25 are aligned. Two ring flanges 24$a,b$ are secured to the two transverse ends of the core segments 10 by flathead bolts 59, which pass through the core segments 10, thread into one ring flange 24A and are countersunk into the second ring flange 24B, so as to maintain a smooth transverse surface in contact with the inner transverse surfaces 621 of the side casings 1a,1b. An annular ring guide 2 is hung onto each transverse side of the six blades 9 by shoulder pins 4, one secured to each side of each blade 9; six elongated slots 202, elongated radially, are equally spaced around each of the annular ring guides 2, into which the shoulder pins 4 extend. The crescent-shaped guide 23, secured to the inner transverse surface of each side casing section 1, substantially fills the gap between the annular ring guide 2 and the ring flange 24, on each side of the core.

There must be sufficient clearance with respect to the blades 7, however, to permit the blades 7 to be able to reciprocate radially relative to the flange rings 24A,B and to the core sectors 10.

The blades 7 are all interconnected by the annular ring guides 2, which surround the front and rear ring flanges 24a,b; the blades 7 are all connected to the ring guides 2 at a position equidistant from the end of the blade. The two annular ring guides 2 are identical and have an internal diameter sufficiently greater than that of the ring flanges 24a,b, so as not to touch the ring flanges 24 and to pass between the ring flanges 24 and the crescent-shaped spacer 23 as the blades 7 reciprocate. The thickness of each ring guide 2, the crescent spacer 23 and the respective ring flanges 24a,b are substantially equal.

The two ring guides 2 are pinned to the front and rear edges 209 of the blades 7 by shoulder pins 4, extending from both edges 209 of each blade 7. The head of each shoulder pin 4 is held within one of the several elongated slots 202, equiangularly located around the ring guides 2. The six blades 7 and the two ring guides 2 thus rotate together with the rotor core 312, but must also move radially relative to the core 312. The slots 202 on the ring guides 2 are elongated in a radial direction to permit some slight relative movement between the rings 2 and the pins 4, but the minor width of each slot provides a slidable fit for the heads of the pins 4.

As shown, there is a central annular gap between the housing sleeves 25, which permits the circulation of working fluid within the central portion of the core 312, to permit uniform radial movement of the blades 7 as the rotor rotates eccentrically within the casing, and to provide lubrication for free movement of the blades.

The open central and toroidal space provided within the rotor 312 provides communication between the fluid located radially behind each blade 7, i.e., in contact with the inward end 166 of each blade 7, thus eliminating any pressure resistance which might otherwise be created by the radial movement of the blades 7.

A second housing sleeve 30 is slip fitted onto the second end of the shaft 28 abutting the rotor; the key slot extending only part of the way along the central shaft channel, thus locking the rotor 312 between the two housing sleeves 30. The second side casing 1a containing the second tapered bearing 16, and the labyrinth seal 19, is also held in place by an end cap 12. The side casing 1a is fitted around the housing sleeve 30 and bolted to the first casing side 1b by the spring-loaded bolts 14. The two end caps 12 are then fully tightened.

The tightness of the fit between the various mating surfaces of the three casing sections 1a,b and 22 and the adjacent side surfaces of the ring flanges 24a,b, and the ring guides 2 and between the core and the crescent spacer 23, can be varied by tightening or loosening the series of spring-loaded peripheral bolts 14,15. The friction losses of the hydraulic units and their pressure-tightness can be varied by such adjustment.

The shafts are each supported by the tapered roller bearings 16 within the front and rear casing sections 1a,b. The shaft 28, which extends to outside of the two casing sides, passes through the labyrinth seals 19, with bronze and Teflon teeth rings, and the stuffing box cap 12.

The roller bearings 16 are open to the circulating hydraulic fluid, for lubrication; and the annular guide rings 2 are made of a material having minimum friction against the steel casings 1, such as Monel or phosphor-bronze.

Figure 8:
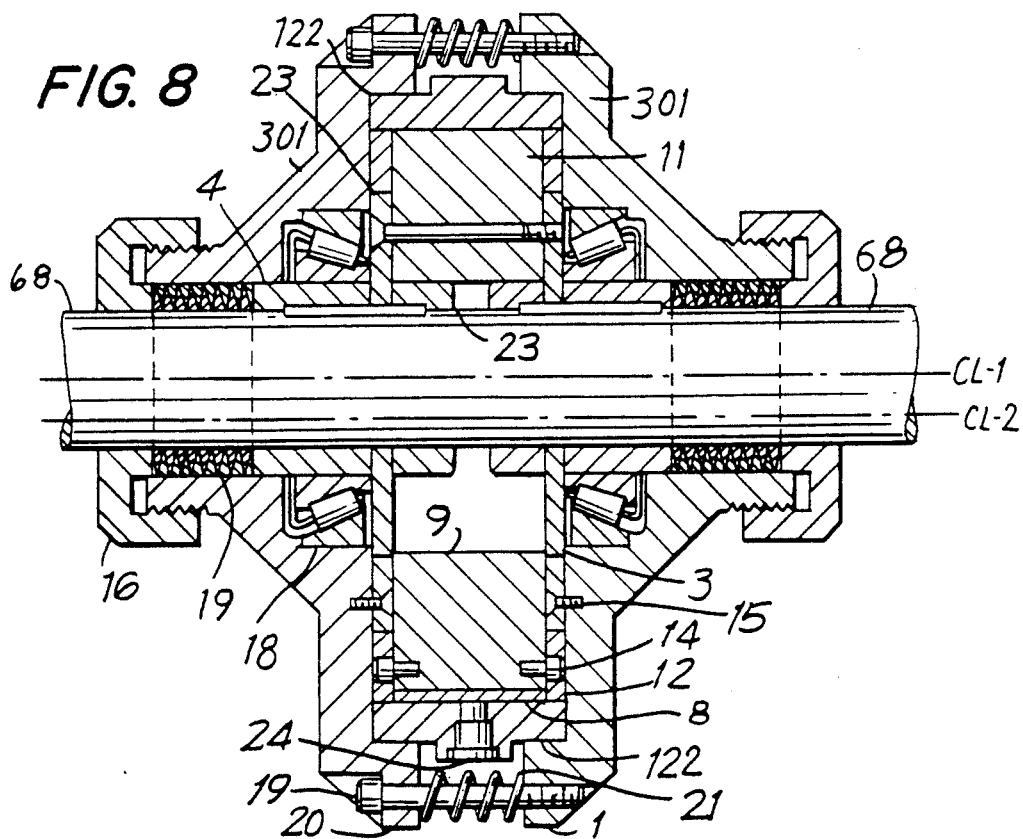
FIG. 8 is a cross-section view, taken along lines B—B of FIG. 6 of the wheel rotator used in the present invention.

The four wheel rotators 200 are of substantially the same design as the turbo-rotator 100 except that there are only three blades 9 and the end of each blade is fitted with a curved shoe 8, to form a more pressure-tight fit with the casing inner surface 22. The wheel rotators 200 are substantially identical to the rotators shown in my earlier copending U.S. Pat. No. 4,947,646, except that there are two opposing shaft ends 68 extending from the rotors, as shown in the drawing of FIG. 8. One of the shafts is directly connected to a vehicle wheel 133, and the opposed second shaft is connected to, e.g., a brake disk 107, of a conventional automotive disk brake.

In the vehicle drive system of this invention, the central turbo-rotator 100 is rigidly secured to a base on the mid portion of the vehicle chassis frame, by bolts through the outer casing flanges.

The port bushings 5,55 are secured at an inner end into the port openings in the central casing 22,122, of each rotator 100,200, and are secured at its outer end to a manifold 30, by a high pressure joint (generally designated by the numeral 29). The high pressure metal-to-metal joint 29 has the structure and mode of operation generally shown by FIGS. 7-9 and the accompanying text, in my copending application Ser. No. 07/513,603, filed Apr. 24, 1990, which is incorporated by reference herein. From the manifold 30 extend three transverse tube stubs 330a,b,c. The laterally extending stubs 330a,b, are each connected through a rotatable joint 104 to the rigid tubing 124. The rotatable joint 104 has a structure and mode of operation similar to the devices shown in FIGS. 1-6 of my copending application Ser. No. 07/513,603, and the accompanying text, and is shown in FIG. 12.

Figure 12:
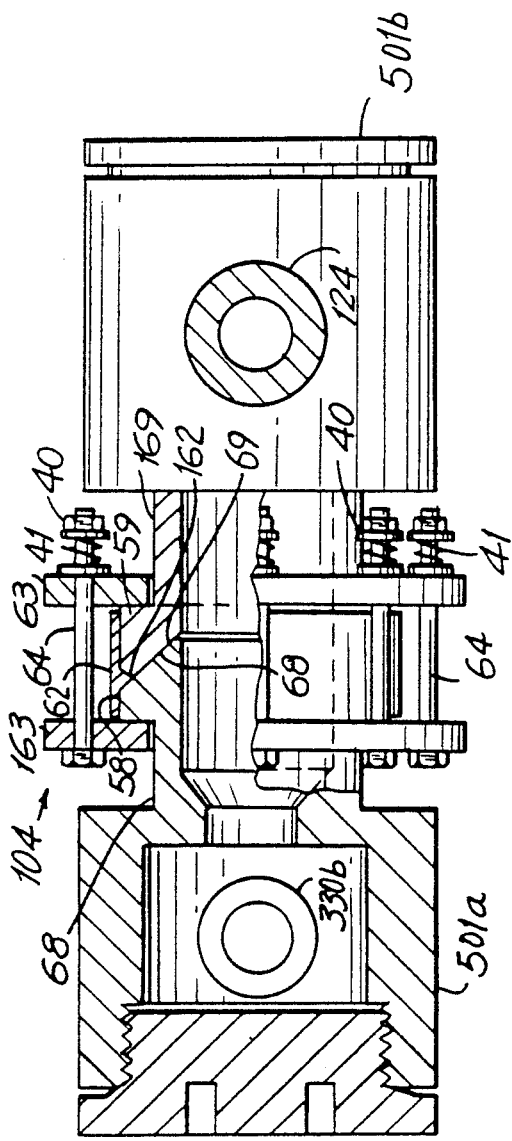
FIG. 12 is an enlarged view of a rotatable high pressure pipe joint used in the hydraulic connections.

Referring to FIG. 12, conduit 330b is rigidly secured to the upper joint body 501a; the longitudinal axis of the conduit 330b extends transversely of the longitudinal axis of the joint body 501. The front wheel conduit 124 is transversely rigidly connected to the lower joint body 501b, in the same manner. The upper and lower joint bodies 501 are in rotatable slidable contact along the machined surfaces 68,69, respectively; the machined surfaces 68,69 can be conical, but at the elevated hydraulic pressures are preferably mating spherical surfaces.

The rigid tubing 124 is in turn rotatably connected to a second rigid tube 121 through another rotatable joint 104. The second tube 121 is in turn perpendicularly connected to one of the two port bushings 55 on a wheel rotator 100. Although the rear wheels 110 are not intended to be dirigible, the rotatable joints 104 are also provided along the tubing to the rear wheel rotators 200C,D; this compensates for any sudden mechanical shock that may occur along the rather lengthy tube line to the rear wheels and thus avoids structurally detrimental flexure of the tubing 105,106.

Figure 4:
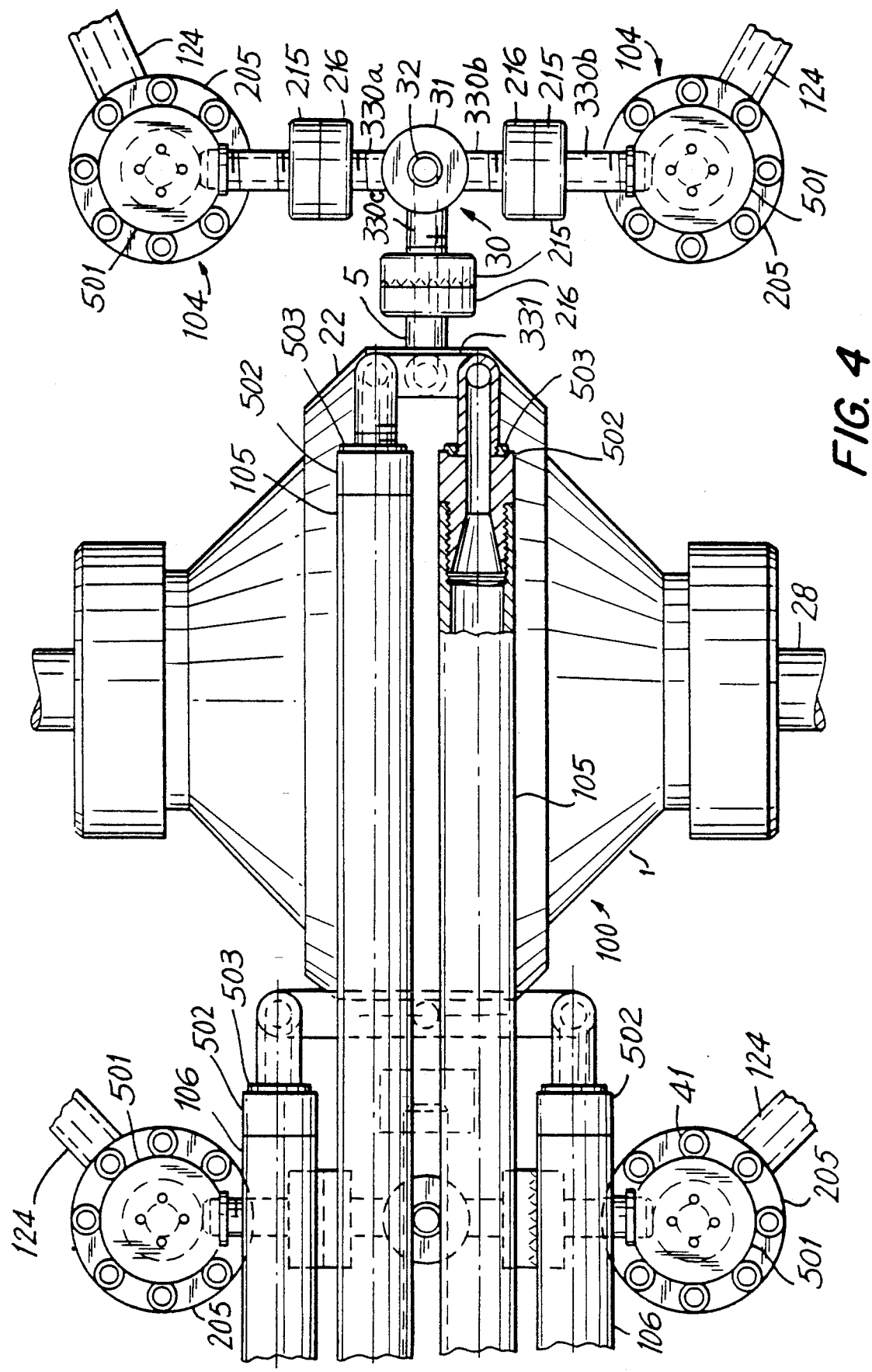
FIG. 4 is a top plan view of the turbo rotator of FIG. 3, including piping.
Figure 5A:
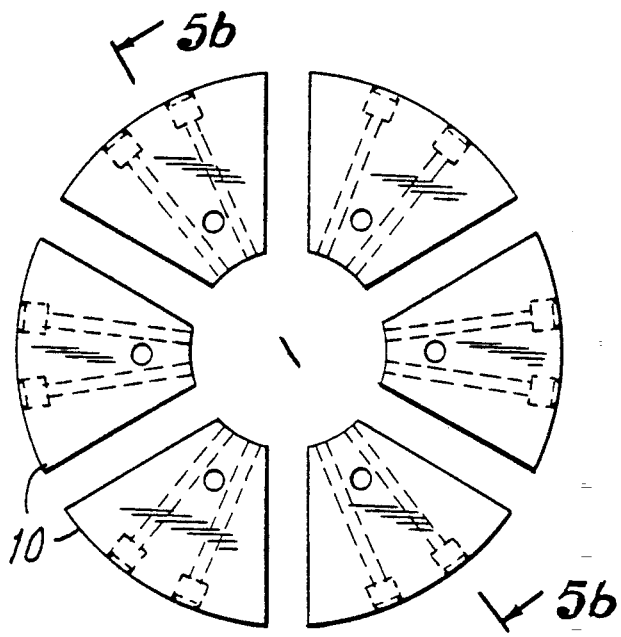
FIG. 5a is a detail side view of the core segments of FIG. 5.
Figure 5B:
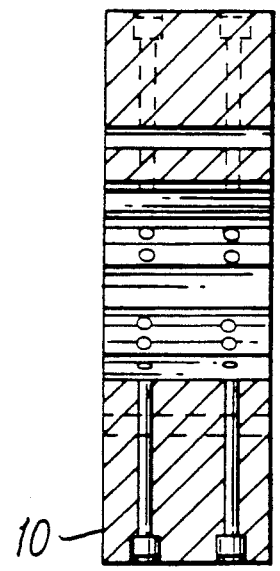
Figure 5C:
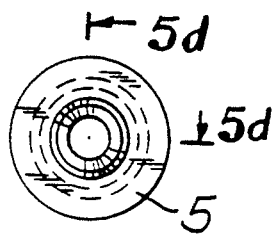
FIG. 5c is a detail end view of the port bushing of FIG. 5.
Figure 5D:
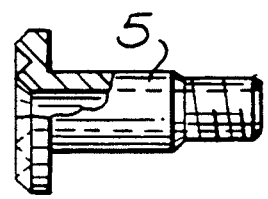
FIG. 5d is a cross-section view taken along lines A—A of FIG. 5c.
Figure 13:
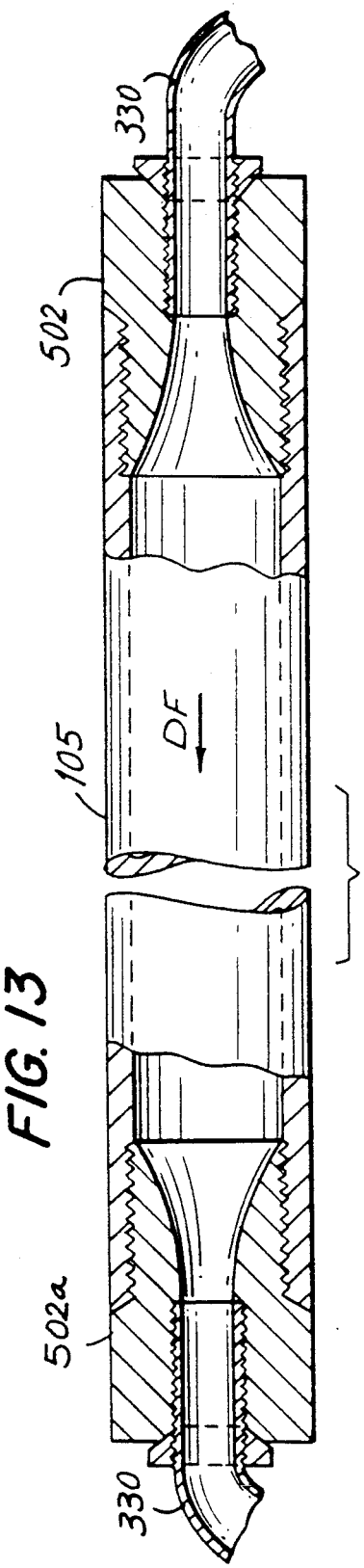
FIG. 13 is a partial cross-section view of a pair of hydraulic flow nozzles in the hydraulic flow lines.

FIG. 13, and FIG. 4, show a fluid flow energy-saving device provided for this system, but which can be applied to any other hydraulic system having a lengthy run of hydraulic pipe. As shown, the tubes 330,331 adjacent the turbo-rotator have a relatively small diameter, e.g., ⅜ in. i.d., to maximize pressure. However, to reduce friction and turbulent flow losses along the pipes, the intermediate rearwardly extending tubes 121 have a relatively large internal diameter, e.g., ⅞ in. To reduce pressure losses, an opposed pair of nozzles 502,502a are provided at opposite ends of the intermediate tube 105, to accommodate the increase in the tube diameter and then the reduction of the tube diameter. Using matching opposed nozzles, the same effect is achieved without regard to the direction of flow ("DF"). This is significant, as explained above.

The flow losses through the tubes 105,106 are reduced by increasing the diameter of these tubes compared to the diameter of the tube stubs 330, and thus reduce linear velocity through the long tubes 105,106. To reduce undesirable expansion or reduction flow losses, at the point of expansion or reduction, the internal nozzles 502 are provided at the expansion or reduction locations. The nozzles 502 reduce turbulence at the points of expansion or reduction, and the larger diameter tubing, for the longer runs of pipe, reduces the linear velocity of the fluid and thus reduces friction and turbulence losses.

The controls for the electro-hydraulic drive system of the present invention can be extremely simple, thus providing an added safety feature for general consumer use. This system permits an operator to control the speed and to brake the vehicle using a single control, e.g., a foot pedal.

Figure 9:
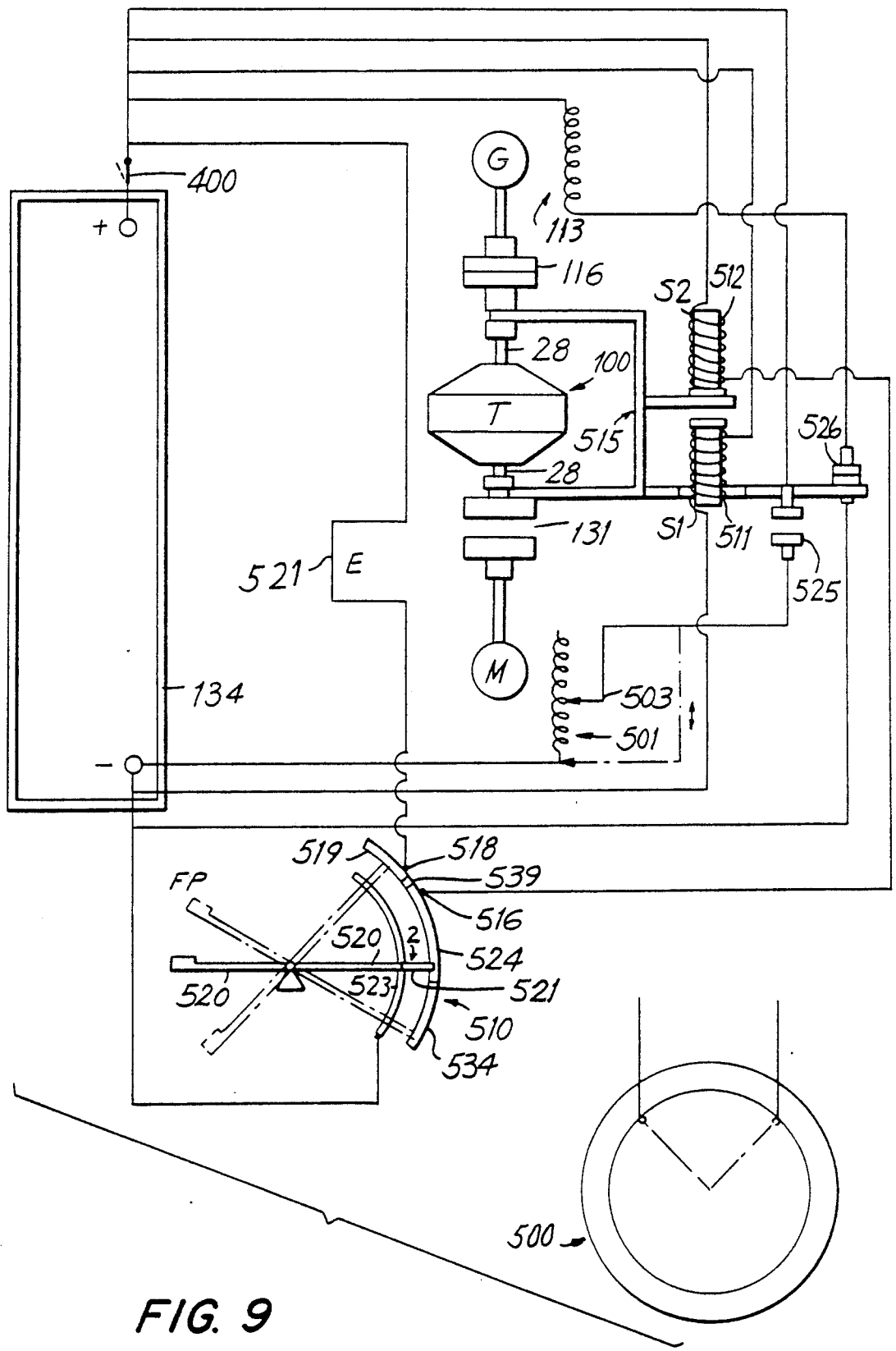
FIG. 9 is a diagrammatic sketch of the electrical system used in the present invention.
Figure 10:
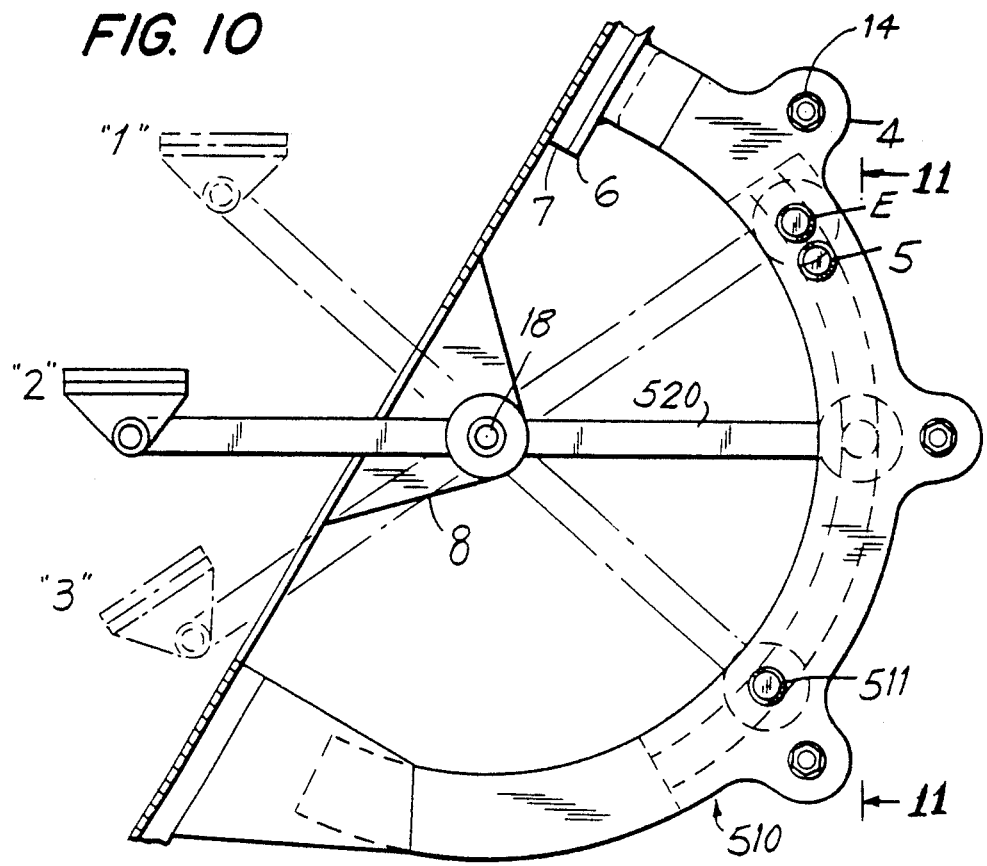
FIG. 10 is a side view in partial cross-section of the operator's foot pedal.
Figure 11:
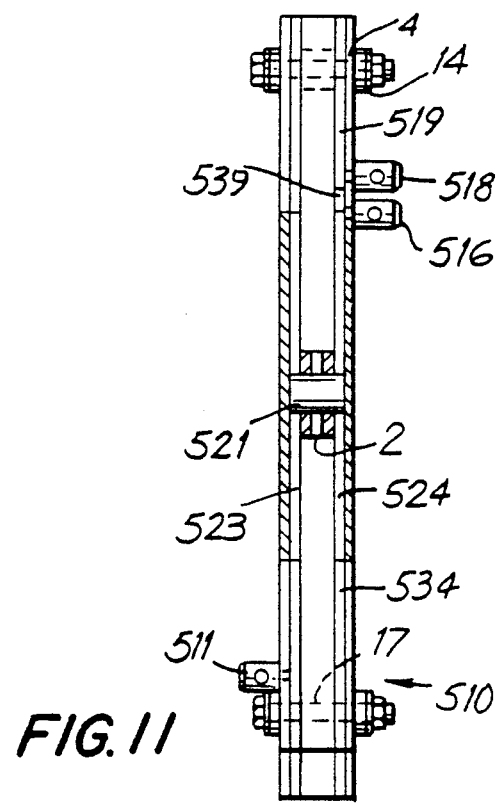
FIG. 11 is an end view in partial cross-section of the operator's foot pedal.

An electrical system and a pedal control is shown in FIGS. 9 through 11. In this schematic example, a simple electromechanical system operates the power couplings. The system is activated by the security switch 400, which places the battery 134 in contact with the control and operating circuit; this directly energizes an electromagnet coil 511. An iron-containing activating frame, generally indicated by the numeral 515, is pulled towards the magnet 511, closing the motor circuit switch 525 and engaging the motor clutch 131.

The operating control switch 500 is mechanically connected directly, by linkages not shown, to a sliding power regulating coil 501. In the "0" position of the master switch 500, the circuit between the battery 134 and the motor 114 is not completed. When the switch is moved to the on positions, i.e., between low "L" and high "H", the circuit is completed and the speed of the motor is regulated by the position of the switch operated coil contact 503 along the length of the coil 501. The vehicle speed is thus set by the operating control switch 500.

When it is desired to reduce the speed of a moving vehicle, the foot pedal switch, generally designated as 510, is operated by moving the pedal 520 from the rest position "1", towards position "2". The foot operated pedal switch 510 comprises foot pedal 520, spring biased to position "1" (shown in phantom lines), a slide contact 521 secured to the pedal 520, and a set of parallel strip conductors: a negative strip conductor 523, extending from the negative terminal 511 to the top of the switch, a first positive strip conductor 524, extending from the end of insulator 534 to the first positive terminal 516, and a second positive strip conductor 519 and second positive terminal 518, separated from the first strip 524 by an insulator strip 539.

The slide contact 521 in its resting, "1", position, contacts the insulator 534 and is out of contact with the positive slide conductors 524,519. In the slowing/recharging position, "2", the slide conductor 521 is in electrical connection between the negative strip 523 and first positive strip 524. In this second position, the second, more powerful, electromagnet 512 is in electrical connection with the battery 134 and is activated. This overcomes the attractive effect of the first electromagnet 511, causing the actuating frame 515 to move towards S2, and thereby opening the motor switch 525 and disengaging the motor clutch 131; this movement also causes the engagement of the generator clutch and the completing of the generator circuit by closing the generator switch 526. This latter condition is shown by the solid lines in FIG. 9. It is understood that any other type of switching means, responsive to an operator, e.g., by movement of the pedal 520, can be used to simultaneously carry out the engagement and disengagement of the clutches 116,131, and closing and opening of the circuits to the motor 114 and generator 113.

When it is desired to bring the vehicle to a complete stop, the "emergency" braking system is activated, and conventional disk or drum brakes are caused to be applied when the pedal 520 is pressed to the "3" position. In this position, the slide conductor 521 connects the negative strip conductor 523 to the second positive strip 519, which is separated from the first positive strip 524 by an insulated gap 539 and connects through the terminal 518 to the brake actuator 521, which can be a conventional power brake unit. As this conventional braking system is not a part of this invention it is not shown in any greater detail.

When a vehicle is brought to a complete stop, preferably both the generator and motor switches 525,526 are opened and both clutches 131,116 are disengaged, mechanically or electrically by, e.g., the brake activator 521; this further conserves the battery power during a lengthy stop. While the car is slowing down, however, the generator clutch 116 is disengaged, and the generator continues to operate and recharge the battery.

Preferably, there is also provided a conventional trickle charging system, for example, so that when the vehicle is parked in a garage for any length of time, the battery can be completely recharged.

Finally, for security reasons, a locking switch should be provided to incapacitate the circuit without the use of a specific key.

The foot pedal 520 preferably is spring-biased, by, e.g., a conventional coil spring, to maintain the pedal in the open position, i.e., the "1", position, where the motor switch is closed.

When the vehicle is caused to slow down, and the motor is disengaged and the generator is engaged, the pressure from the turbo-rotator 100 quickly drops to below that created in the wheel rotators 200 by the rolling wheels (from the momentum of the vehicle), and the wheel rotators 200 pressurize the turbo-rotator, causing it to turn the generator armature 113 and thus recharge the battery 134.

Preferably, the disk brake system includes an antilocking sensor to prevent skidding. When the vehicle is brought to a complete stop for any length of time, the main power switch should be turned to "off" to conserve power and to prevent damage to the motor.

The foot pedal is preferably spring-biased, such that when releasing the pedal, the spring brings the pedal back to its operating position.

This invention thus results in a most efficient use and recapture of the electrical energy stored in a battery, thus greatly extending the range of such an electrically powered vehicle.

By careful driving, and the elimination of sudden emergency stops, the range of such a vehicle may be doubled, or even tripled, without any increase in complexity of the system. Indeed the system of the present invention is extremely simple, and there are no one way flow devices required, because the nature of this invention requires a hydraulic flow system wherein the fluid flow is reversible within the system.

Preferably, the working fluid is a liquid having a sufficiently high viscosity to provide lubrication for the system. Petroleum based liquids are preferred. There is preferably at least a minor proportion of gas in the overall closed system, i.e., including the central unit and the wheel units and the connecting tubing.

Preferably, at least about 5% of the volumetric capacity of each hydraulic unit should be filled with a gas, when the principal hydraulic operating fluid is a liquid, to make the system more flexible. The gas is preferably a non-condensable gas, and both the gas and the transmission/lubricating liquid should be mutually substantially chemically inert with respect to each other and to the material of construction forming the internal exposed surfaces of each of the rotary fluid drive units.

The patentable embodiments of this invention which are claimed are as follows:

1. A hydraulic electric motor vehicle having a plurality of wheels driven by an electro-hydraulic system, the system comprising an electric motor, disengagable motor coupling means, a central turbo-rotator hydraulic motor having two hydraulic fluid pressure ports and being mechanically linked to be driven by the electric motor through the motor coupling means; a plurality of hydraulic rotor wheel motors each having a pair of hydraulic fluid pressure ports and each being mechanically linked to a wheel to drive the wheel when operating as a motor, or to be driven by the rotation of the wheel when operating as a pump; fluid flow conduits interconnecting each of the two ports on the central motor to respective ones of the pair of ports on each of the wheel motors; disengagable generator coupling means; an electric generator being mechanically linked to be driven by the hydraulic motor through the generator coupling means; electric storage means; and switch means, the switch means being designed to place the electric storage means in disconnectable and alternative electrical connection with the electric motor and the generator and to alternatively engage and disengage the motor and generator coupling means, such that the generator coupling means is disengaged when the storage means is in electrical connection with the electric motor, and the motor coupling means is disengaged when the storage means is in electrical connection with the generator.

2. The hydraulic electric motor vehicle of claim 1, wherein the motor and generator coupling means are mechanical clutch means.

3. The hydraulic electric motor vehicle of claim 1, wherein the switch means is operated by a pedal.

4. The hydraulic electric motor vehicle of claim 1, further comprising brake means operatively attached to the wheels to bring the vehicle to a complete halt.

5. The hydraulic electric motor vehicle of claim 4, wherein the brake means are friction brakes and are actuated by the switch means.

6. The hydraulic electric motor vehicle of claim 1, wherein the turborotator motor and the wheel rotator motors each comprise a substantially cylindrical chamber having an internal cylindrical surface, centered about a first central axis; a rotor, rotatably mounted within the chamber and rotatable about a second axis parallel to the first central axis but radially displaced therefrom; and an intake opening and an exhaust opening into the chamber through the internal cylindrical surface, the intake and exhaust openings being angularly displaced thereabout; the rotor comprising a substantially rigid core having at least three radially extending channels therethrough, and rotor blades slidably secured thereto so as to be radially reciprocally movable within the channels, the blades being interconnected so as to be guided to move radially as a single unit during rotation of the rotor, and a contact surface, on the radially outwardmost portion of each blade member, the blade members being so positioned and dimensioned as to maintain the contact surface in contact with the inner cylindrical surface and the inlet and outlet openings always separated by at least one rotor blade, and a pair of opposed mechanical energy conducting members, secured concentrically to the core and extending transversely from each rotor to transmit mechanical energy, the mechanical energy conducting members on the turborotator being linked to the motor coupling and the generator coupling, and one of each of the mechanical energy conducting members on each wheel rotator being linked to a wheel.

7. The hydraulic electric motor vehicle of claim 1, wherein the wheel rotator motors are of smaller combined volumetric capacity than the central turborotator motor.

8. The hydraulic electric motor vehicle of claim 1, wherein the electro-hydraulic system is so designed that the central turborotator unit operates at a greater rotational velocity than do the wheel rotator units.

9. The hydraulic electric motor vehicle of claim 6, further comprising sealing wiping means pivotably secured to the radially outermost ends of the wheel rotator blades, and designed to increase the pressure tightness of the contact between the blades and the internal cylindrical surface.

10. The hydraulic electric motor vehicle of claim 1, wherein the electric storage means comprises a battery of galvanic cells.

11. The hydraulic electric motor vehicle of claim 1, wherein at least one of the wheels linked to a rotator wheel motor is dirigibly steerable.

12. The hydraulic electric motor vehicle of claim 11, wherein the fluid flow conduits comprise a plurality of rigid tubes, and further comprising rotatable pressure-tight joints connecting adjacent tubes and which permit relative rotation between the tubes and the rotator motors and between adjacent tubes, when the dirigibly steerable wheel is pivoted.

* * * * *